United States Patent [19]
Purtschert

[11] 3,944,304
[45] Mar. 16, 1976

[54] GAS-LUBRICATED SELF-PRESSURIZING RADIAL BEARING

[75] Inventor: Werner Purtschert, Winterthur, Switzerland

[73] Assignee: Sulzer Brothers Limited, Winterthur, Switzerland

[22] Filed: Oct. 10, 1974

[21] Appl. No.: 513,835

[30] Foreign Application Priority Data
Oct. 11, 1973 Switzerland.................. 14477/73

[52] U.S. Cl. ............... 308/9; 308/122; 308/DIG. 1
[51] Int. Cl.² ......................................... F16C 17/16
[58] Field of Search ............ 308/9, 73, DIG. 1, 72, 308/121, 122, 36.3

[56] References Cited
UNITED STATES PATENTS
3,837,716  9/1974  Allen et al. ............................. 308/9

FOREIGN PATENTS OR APPLICATIONS
979,158  1/1965  United Kingdom...................... 308/9

Primary Examiner—M. Henson Wood, Jr.
Assistant Examiner—Gene A. Church
Attorney, Agent, or Firm—Kenyon & Kenyon Reilly Carr & Chapin

[57] ABSTRACT

The bearing segments of the bearing are made with asymmetrical bearing surfaces of concave and convex shape. In addition, one or more flow ducts communicate the concave bearing surface with the convex bearing surface in each bearing segment so that during operation a part of the lubricating film between the shaft and bearing segment flows to a gap between the housing and bearing segment to float the bearing segment.

12 Claims, 10 Drawing Figures

GAS-LUBRICATED SELF-PRESSURIZING RADIAL BEARING

This invention relates to a gas-lubricated self-pressurizing radial bearing and particularly to a bearing segment for such a bearing.

As is known, gas-lubricated self-pressurizing radial bearings have been used for supporting shafts, particularly shafts of high speed machines. Generally, these bearings use a plurality of self-adjusting bearing segments in order to support the shafts in the bearing during rotation. In such bearings, wedge-shaped gaps, also referred to as pressure cones which produce the dynamic buoyancy pressure for supporting the shaft, are formed between the bearing segments and the shaft when the shaft rotates. The angle of slope of the pressure wedges adjuts itself automatically if the pivoting point of the bearing segments is suitably selected. The angle of slope of the pressure wedges depends on the position of the pivoting point in the circumferential orientation as well as in the radial orientation, on the mean gap height and, also on the friction to which the bearing segments are subjected in the bearing shells in which they are disposed. Friction is the decisive feature and should be as low as possible.

In order to ensure low-friction adjustment of the bearing segments in the optimum position, it has been known to produce a static gas cushion between the bearing shell and the adjoining bearing surface of the bearing segments so that there is no physical contact between the two. Generally, in order to produce the static gas cushion, ducts have been drilled through the housings in which the bearing shells are recessed to extend into the bottom of the bearing shells so that lubricating gas can be supplied through the duct. The static head of such a gas cushion must, however, be constantly adapted to the rotational speed of the shaft, that is to the dynamic pressure in the pressure wedge. The static head must therefore be constantly regulated from the outside in dependence on the rotational speed. This regulation is complicated and represents a disadvantage of the known bearing.

Accordingly, it is an object of the invention to provide a bearing of the kind defined hereinbefore in which the static pressure in the gap between the bearing segments and the housing corresponds to the pressure conditions in the pressure wedge between the bearing segment and the shaft in all operating phases but without calling for a complicated regulating device.

It is another object of the invention to provide a bearing segment for a gas-lubricated radial bearing which is of simple construction to achieve flotation when in use.

Briefly, the invention provides a gas-lubricated self-pressurizing radial bearing for rotatably mounting a shaft in a housing with at least one recess. The bearing comprises a plurality of self-adjusting bearing segments each of which is disposed in a recess for pivoting about an axis. Each segment has a concave rotation ruled bearing surface facing the shaft and a convex rotation rules bearing surface facing the recess. These bearing surfaces are asymmetrical relative to a plane passing through the pivot axis and radially of the shaft. In addition, each segment has at least one flow duct communicating the bearing surfaces with each other. The flow duct may have one branch point within the bearing segment from which two branch flow ducts extend to the convex bearing surface.

In one embodiment, the flow duct extends in a fan-like pattern towards the convex bearing surface. In another embodiment, the flow duct terminates in a recess in the convex bearing surface.

In still another embodiment the bearing segment includes a porous member forming at least a part of the convex bearing surface.

In still another embodiment, a bearing segment has at least one secondary duct extending from the flow duct to at least one side of the bearing segment to accommodate the side with the concave bearing surface. In addition, this side of the bearing segment may also be at least partly porous.

These and other objects and advantages of the invention will become more apparent from the following detailed description and appended claims taken in conjunction with the accompanying drawings in which:

FIG. 1b illustrates a view taken on line Ib—Ib of FIG. 1a;

FIG. 2b illustrates a view taken on line IIb—IIb of FIG. 2a;

FIG. 6b illustrates a view taken on line VIb—VIb of FIG. 6a; and

Figure 1A:
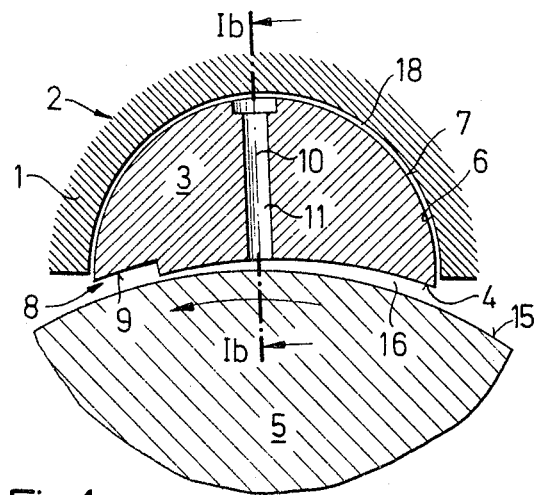
FIG. 1a illustrates a cross-sectional view of a radial bearing according to the invention.

Referring to FIG. 1a, the radial bearing includes a plurality of bearing segments 3, for example at least three (only one of which is shown for clarity) which are each mounted in a bearing shell 1 or recess of a fixed housing 2. The bearing segments 3 are spaced about the housing 2 to rotatably mount a shaft 5. To this end, each bearing segment 3 has a bearing surface 4 facing the shaft 5 as well as a bearing surface 7 facing a mating bearing surface 6 in the shell 1. Both bearing surfaces 4 and 7 of each bearing segment 3 have a cylindrical shape, the bearing surface 4 being of concave-cylindrical shape and the bearing surface 7 being of convex-cylindrical shape. The run-out side 8 of each bearing segment 3 has a recess 9 which extends parallel to the longitudinal axis of the bearing segment, i.e. transversely to the plane of the drawing. Owing to the pressure of the recess 9, the bearing surface 4 is asymmetrical with respect to the axis 10 on which the pivoting point of the bearing segment is located. The axis 10 is disposed in a plane disposed radially of the shaft 5. To this end the pivot point may be disposed within or outside the bearing segment 3.

Each bearing segment 3 is provided with at least one duct 11 which extends into the bearing surface 4 and into the bearing surface 7 to communicate the bearing surfaces 4, 7 with each other. Rotation of the shaft 5 in the direction indicated by the arrow causes the pressure of a lubricating gas between the shaft 5 and housing 2 to increase between the surface 15 of the shaft 5 and the bearing surface 4. As a result, a dynamic buoyancy acts on the bearing segment 3 causing the bearing segment 3 to pivot in the anticlockwise direction as viewed and producing a wedge-shaped gap 16 between the two. Part of the lubricating gas flows from the pressure wedge in the gap 16 and follows the pressure gradient through the duct 11 to a gap 18 between the bearing segment 3 and the bearing surface 6 in the bearing shell 1. The pressure in the gap 18 therefore rises so that the bearing segment 3 is lifted off the floor of the bearing shell 1 and is positioned therein without physical contact in a floating fashion. It follows that owing to the communication between the two gaps 16 and 18 via the duct 11, the load bearing capacity of the static gas cushion in the gap 18 constantly and automatically adjusts itself to the load bearing capacity of the pressure wedge in the gap 16 between the shaft 5 and the bearing segment 3. The optimum buoyancy inclination of the pressure wedge 16 is obtained by virtue of the lack of symmetry of the bearing surface 4 with respect to the axis 10.

Figure 1B:
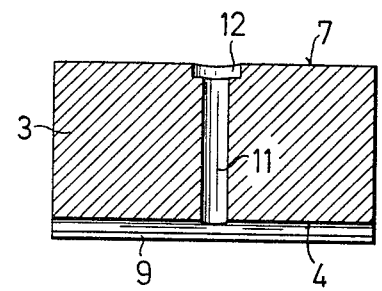

Referring to FIGS. 1a and 1b, the flow duct 11 may terminate in a recess or an opening 12 in the bearing surface 7 the diameter of which is larger than that of the duct 11. This increases the stability of the bearing segment 3. The opening 12 may also be of different shape, for example round or rectangular. The opening 12 may also have the shape of a groove which extends in the longitudinal orientation of the bearing segment 3. The groove may also be frame shaped.

Figure 2A:
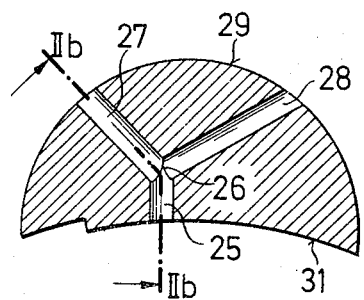
FIG. 2a illustrates a bearing segment the shape of which is modified by comparison to that of FIG. 1.
Figure 2B:
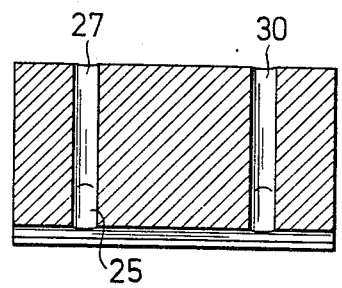

Referring to FIGS. 2a and 2b, the bearing segment can alternatively be provided with a flow duct 25 which merges within the bearing segment at a branch point 26 into two branch flow ducts 27, 28. Both branch ducts 27, 28 extend into a bearing surface 29 of the bearing segment which is disposed in a bearing shell (not shown). All three ducts are disposed in a plane which is normal to the axis of rotation of the shaft (not shown). The bearing segment is also provided with a second duct 30 (FIG. 2b) which also merges into two branch ducts. The provision of a plurality of connecting ducts and branch ducts improves the pressure distribution over the bearing surface 29 and thus improves the stability of the bearing segment.

As shown, the opening of the duct 25 in the bearing surface 31 need not necessarily be disposed coaxially of the axis of the bearing segment (as shown in FIG. 1) but may be displaced in the circumferential direction. In this way, it is possible to select the magnitude of the pressure which is tapped off from the duct 25 in the pressure wedge since this pressure initially increases towards the direction of rotation of the shaft and then again decreases.

Figure 3:
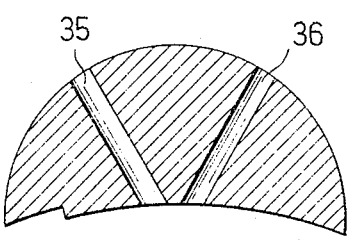
FIG. 3 illustrates a cross-sectional view of a bearing segment having branch flow ducts extending to the convex bearing surface.

Referring to FIG. 3, a bearing segment may have two separate ducts 35, 36 which are disposed in a plane normal to the axis of rotation of the shaft. In this case, a second pair of ducts may also be provided in a second, parallel plane. The bearing segment may then have ducts disposed in a fan-like pattern instead of the previously mentioned parallel arrangement. The beginning of each duct may be disposed in a suitable zone of the pressure wedge.

Figure 4:
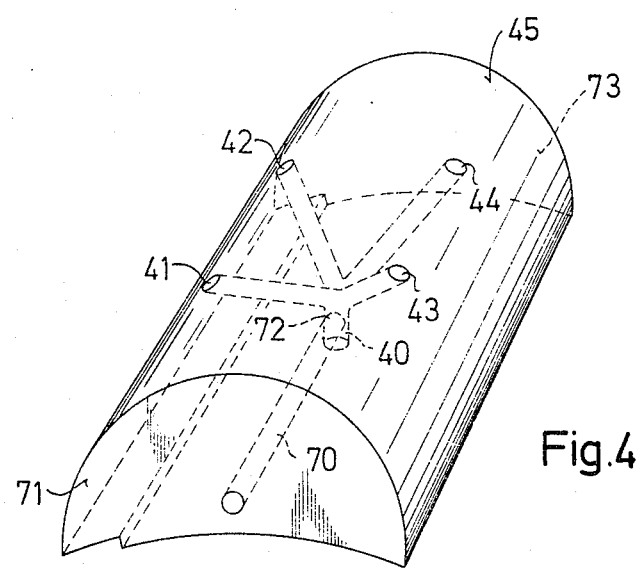
FIG. 4 illustrates a perspective view of a modified bearing segment having ducts extending to the side and to the convex bearing surface.

Referring to FIG. 4, a bearing segment may have a duct 40 which is positioned approximately in the middle of the bearing segment and extends from the concave bearing surface to branch ducts 41, 42, 43 and 44 which branch off and extend to the convex bearing surface 45. The openings of the branch ducts 41, 42, 43, 44 in the bearing surface 45 may be disposed in pairs on a line which is parallel to the longitudinal axis of the bearing segment.

In order to ensure practically friction-free support of the bearing segment with regard to the side walls of the bearing shell (not shown) the gap between the side walls of the bearing segment and the side walls of the bearing shell may be provided with a lubricating gas. To this end the bearing segment is provided with a secondary duct 70 in the longitudinal direction which extends from the common duct 40 at a point 42 into a side wall 71. The gas stratum which is produced between the side wall 71 and the adjoining wall of the bearing shell substantially reduces the friction. The oppositely disposed side wall 73 may, of course, also be provided with a gas stratum by the provision of a second duct (not shown) which merges into the side wall 73.

Figure 5:
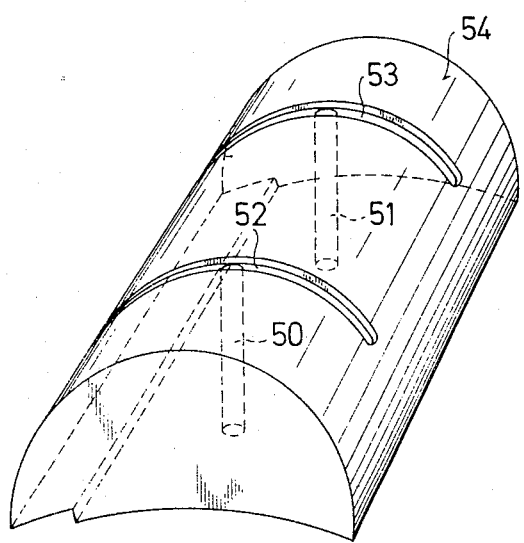
FIG. 5 illustrates a perspective view of a further modified bearing segment having ducts which terminate in recesses in the convex bearing surface.

Referring to FIG. 5, a bearing segment may also have two flow ducts 50, 51 each of which extends into a groove 52, 53 respectively of a convex-cylindrical bearing surface 54. The two grooves 52, 53 may also communicate with each other through one or more grooves (not shown) in the bearing surface 54.

Figure 6A:
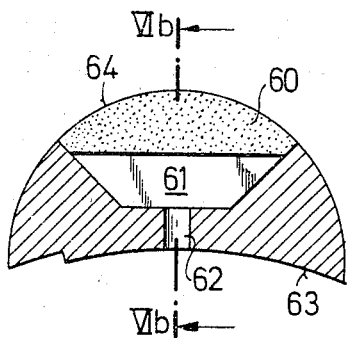
FIG. 6a illustrates a cross-sectional view of a modified bearing segment having a porous convex bearing surface.
Figure 6B:
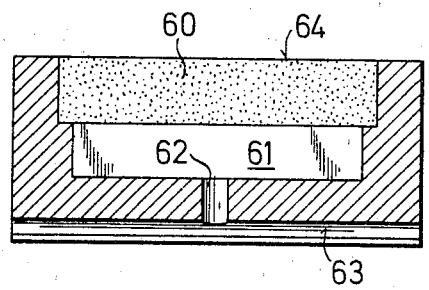

Referring to FIG. 6, a bearing segment may have a porous member 60 mounted in a recess 61 to form at least a part of the convex bearing surface. The recess also communicates with a duct 62 which extends into the concave bearing surface 63 of the bearing segment. The gas supplied through the duct 62 from the pressure wedge which adjoins the bearing surface 63 is diffusely distributed by the porous member 60 over the bearing surface 64, thus improving the stability of the bearing segment.

Figure 7:
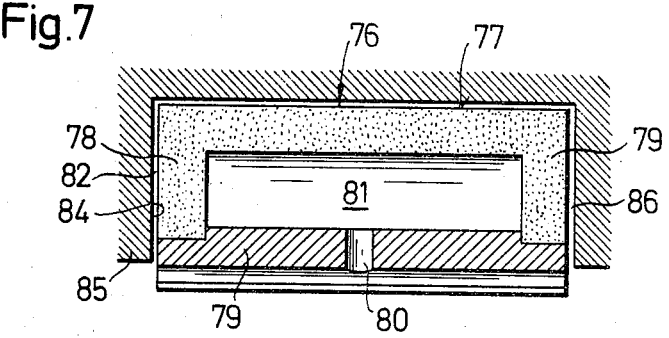
FIG. 7 illustrates a cross-sectional view of a further modified bearing segment having porous sides and a porous convex bearing surface.

Referring to FIG. 7, one or both sides of the bearing segment may be provided with a porous side wall instead of with a duct but for the same purpose. In such a case the lower solid part 75 of the bearing segment as viewed is provided with a porous cap 76 which forms a convex bearing surface 77 and two side walls 78 and 79. The gas which flows through a bore 80 from the pressure wedge flows through the cavity 81 of the bearing segment and then through the bearing surface 77 and the two side walls 78 and 79. A gas cushion 82 is thus formed between the side wall 84 of the bearing shell and the side wall 78 of the bearing segment. A gas cushion 86 is formed in similar manner on the other side of the bearing segment.

Although the invention is described for a bearing segment with cylindrical bearing surfaces it is of course possible for both surfaces to take the form of other rotation ruled surfaces, for example conical surfaces.

What is claimed is:

1. In combination,
   a housing having at least a recess therein;
   a shaft rotatably mounted in said housing; and
   a gas-lubricated self-pressurizing radial-bearing comprising a plurality of self-adjusting bearing segments, each said bearing segment being disposed in a respective recess for pivoting therein about an axis, each said bearing segment having a concave rotation ruled bearing surface facing said shaft and a convex rotation ruled bearing surface facing said recess, said bearing surfaces being asymmetrical relative to a plane passing through said axis and radially of said shaft, and at least one flow duct in said bearing segment communicating said bearing surfaces with each other.

2. The combination as set forth in claim 1 wherein said flow duct includes at least two branch flow ducts extending to said convex bearing surface and a common duct extending from said concave bearing surface to said branch flow ducts.

3. The combination as set forth in claim 1 wherein said flow duct extends in a fan-like pattern towards said convex bearing surface.

4. The conbination as set forth in claim 1 which further includes a recess in said convex bearing surface in communication with a terminal end of said duct.

5. The combination as set forth in claim 1 wherein said bearing segment includes a porous member forming at least a part of said convex bearing surface.

6. The combination as set forth in claim 1 which further includes at least one secondary duct extending from said flow duct to at least one side of said bearing segment to communicate said one side with said concave bearing surface.

7. The combination as set forth in claim 6 wherein said side is at least partly porous.

8. A gas-lubricated bearing comprising
a housing having a plurality of circumferentially spaced recesses in an internal wall thereof; and
a plurality of bearing segments for supporting a shaft in said housing, each said bearing segment being disposed in a respective recess for pivoting therein about an axis and having a concave rotation bearing surface on one side and a convex rotation bearing surface facing said recess in mating relation, said bearing surfaces being asymmetrical relative to a mid-plane passing through said axis, and at least one flow duct in each said bearing segment communicating said bearing surfaces with each other.

9. A bearing as set forth in claim 8 which further includes at least one secondary duct communicating said concave bearing surface with at least one side of said bearing segment.

10. A bearing segment for a gas-lubricated radial bearing comprising a concave bearing surface on one side, a convex bearing surface on an opposite side, and a flow duct communicating said bearing surfaces with each other, said bearing surfaces being asymmetric to a mid-plane passing transversely through said bearing surfaces.

11. A bearing segment as set forth in claim 10 wherein each bearing surface is cylindrical.

12. A bearing segment as set forth in claim 10 which further has a longitudinal axis and comprises a recess parallel to said longitudinal axis between said bearing surfaces and along one edge of said bearing segment.

* * * * *

UNITED STATES PATENT AND TRADEMARK OFFICE
CERTIFICATE OF CORRECTION

PATENT NO. : 3,944,304

DATED : March 16, 1976

INVENTOR(S) : Werner Purtschert

It is certified that error appears in the above-identified patent and that said Letters Patent are hereby corrected as shown below:

Column 1, line 63, "rules" should be --ruled--.

Column 2, lines 60 - 61, "pressure" should be --presence--.

Column 5, line 15, "conbination" should be --combination--.

Signed and Sealed this

Twentieth Day of July 1976

[SEAL]

Attest:

RUTH C. MASON
*Attesting Officer*

C. MARSHALL DANN
*Commissioner of Patents and Trademarks*